US011178078B2

(12) United States Patent
Stoehr et al.

(10) Patent No.: US 11,178,078 B2
(45) Date of Patent: Nov. 16, 2021

(54) METHOD AND APPARATUS TO INCREASE PERSONALIZATION AND ENHANCE CHAT EXPERIENCES ON THE INTERNET

(71) Applicant: XSELL Technologies, Inc., Chicago, IL (US)

(72) Inventors: Mark Stoehr, Chicago, IL (US); John Sorrentino, Chicago, IL (US); Chandler Gegg, Chicago, IL (US); Matthew B. Coughlin, Tinley Park, IL (US)

(73) Assignee: XSELL TECHNOLOGIES, INC., Chicago, IL (US)

( * ) Notice: Subject to any disclaimer, the term of this patent is extended or adjusted under 35 U.S.C. 154(b) by 167 days.

(21) Appl. No.: 15/090,004

(22) Filed: Apr. 4, 2016

(65) Prior Publication Data

US 2016/0294739 A1 Oct. 6, 2016

Related U.S. Application Data

(60) Provisional application No. 62/142,768, filed on Apr. 3, 2015, provisional application No. 62/232,859, filed on Sep. 25, 2015.

(51) Int. Cl.
*G06F 15/16* (2006.01)
*H04L 12/58* (2006.01)
(Continued)

(52) U.S. Cl.
CPC ............. *H04L 51/04* (2013.01); *G06Q 30/01* (2013.01); *G06Q 30/0269* (2013.01); *H04L 67/141* (2013.01)

(58) Field of Classification Search
CPC ........ H04L 51/04; H04L 67/141; G06Q 30/01
(Continued)

(56) References Cited

U.S. PATENT DOCUMENTS 6,519,628 B1 2/2003 Lacascio
7,761,321 B2 7/2010 Kannan et al.
(Continued)

OTHER PUBLICATIONS

Transmittal; International Search Report; and Written Opinion of the International Searching Authority for International Application No. PCT/US2016/025887 dated Jun. 24, 2016.

*Primary Examiner* — Suraj M Joshi
*Assistant Examiner* — Joel Mesa
(74) *Attorney, Agent, or Firm* — McCracken & Gillen LLC

(57) ABSTRACT

Computer-implemented method and apparatus for placing a request for an Internet chat session between a visitor and a chat persona. A client device displays to the visitor (i) a plurality of chat personas, and (ii) a plurality of chat actions determined by a visitor-identifier associated with the visitor. In response to visitor selections, a chat system server selects (i) at least one chat persona and (ii) at least one chat action. The client device sends to the chat system server (i) a chat request to begin a chat session, and (ii) the visitor-identifier. The chat system server receives the chat request and the visitor identifier. The chat system server retrieves from memory additional information corresponding to the received visitor-identifier. The chat system server generates a personalized chat session between the identified visitor on the client device and the selected persona on the chat system server, using the retrieved additional information.

20 Claims, 10 Drawing Sheets

(51) Int. Cl.
*G06Q 30/00* (2012.01)
*G06Q 30/02* (2012.01)
*H04L 29/08* (2006.01)

(58) Field of Classification Search
USPC .................................................. 709/206, 204
See application file for complete search history.

(56) References Cited

U.S. PATENT DOCUMENTS

| | | |
|---|---|---|
| 7,996,251 B2 | 8/2011 | Kannan et al. |
| 8,260,846 B2 | 9/2012 | Lahav |
| 8,296,437 B2 | 10/2012 | Pankratov |
| 8,396,741 B2 | 3/2013 | Kannan et al. |
| 8,539,028 B2 | 9/2013 | Anka |
| 8,565,411 B2 | 10/2013 | Kannan et al. |
| 8,566,135 B2 | 10/2013 | Kannan et al. |
| 8,661,049 B2 | 2/2014 | Will et al. |
| 8,737,599 B2 | 5/2014 | Kannan et al. |
| 8,738,732 B2 | 5/2014 | Karidi |
| 8,762,313 B2 | 6/2014 | Lahav et al. |
| 8,782,168 B2 | 7/2014 | Anka |
| 8,799,200 B2 | 8/2014 | Lahav |
| 8,805,844 B2 | 8/2014 | Schorzman et al. |
| 8,805,941 B2 | 8/2014 | Barak et al. |
| 8,862,684 B2 | 10/2014 | Tyukasz et al. |
| 8,868,448 B2 | 10/2014 | Freishtat et al. |
| 8,886,724 B2 | 11/2014 | Anka |
| 8,918,465 B2 | 12/2014 | Barak |
| 8,929,546 B2 | 1/2015 | Vukoszavlyev |
| 8,935,619 B2 | 1/2015 | Kannan et al. |
| 8,943,002 B2 | 1/2015 | Zelenko et al. |
| 8,954,539 B2 | 2/2015 | Lahav |
| 2003/0065524 A1 | 4/2003 | Giacchetti et al. |
| 2009/0271205 A1* | 10/2009 | Finn .................. G06Q 30/0281 705/346 |
| 2010/0325216 A1 | 12/2010 | Singh et al. |
| 2014/0058894 A1 | 2/2014 | Honehacker |
| 2016/0225372 A1* | 8/2016 | Cheung .................. G10L 15/22 |

* cited by examiner

List of indicated actions:

Select one of the chat personas below
to personalize your chat session

In some embodiments there may be
additional details describing an
indicated action.

View additional details before
requesting a personalized chat session

Fig 6b

METHOD AND APPARATUS TO INCREASE PERSONALIZATION AND ENHANCE CHAT EXPERIENCES ON THE INTERNET

This application claims priority to U.S. Provisional Patent Application No. 62/142,768, filed Apr. 3, 2015, and to U.S. Provisional Patent Application No. 62/232,859, filed Sep. 25, 2015, both of which are incorporated herein by reference.

TECHNICAL FIELD

The present invention relates to a computer-implemented method and apparatus for chatting and, more particularly, to a method and system for beginning a chat session over a network such as the Internet.

BACKGROUND OF THE INVENTION

Website operators often use their web pages as portals for ecommerce. In attempting to better sell and market, considerable effort is often used to personalize the website to better suit different visitors. One approach is to provide an online chat system to the visitor. A chat system is the means through which chat, along with, for example, one or more of images, videos, and software programs, are sent bi-directionally between senders and recipients. Most notably such a chat system includes (i) instantaneous or near-instantaneous bidirectional transmission between at least one chat agent and one or more chat clients via one or more chat servers, and (ii) a network of occasionally-connected devices through, for example, the Internet. The term "chat server", as described herein, refers broadly and inclusively to one or more connected computers that collect(s) information derived from chat and chat systems and distribute(s) chat systems' information to servers, other chat servers, and/or electronic devices, for purposes that may include business development solutions. Connecting a client computer or electronic device through a network or chat server computer can be termed a "chat client." The term "chat agent" refers to a user of the chat system for the purpose of business development including targeted sales, marketing, information, or customer support services.

One increasingly popular approach to chat systems connects a chat client to a chat agent via a network of connected devices and chat servers for the purposes of business development solutions. "Chat agent work" may include work using a computer with real time network communications and a chat server with an occasionally-connected augmented dashboard. Through connection to one or more chat servers, an agent participates in the chat system for mostly business development purposes.

Business development solutions may also include the use of an augmented dashboard which, when occasionally connected to a chat server or servers, can format and send data or information corresponding to chat client and/or chat agent user behavior patterns taking place during a chat or within chat system participation that includes (but is not limited to) internet browsing activities and information or data that may or may not promote business development solutions. The purpose of such chat sessions may include the service of customer-to-business electronic communications via the Internet. The chat client preferably connects to a chat agent computer (and/or server) running a software application or augmented dashboard including a web browser allowing one user to chat with another user bi-directionally, namely a chat agent communicating with one or more chat clients as part of a chat system. Communication via a chat server between chat agent and chat client is purposed to provide business development solutions that may include customer service solutions alternative to call centers.

While a typical phone call center may promote business development including customer service solutions, it is not designed to deliver the type of personalized experience a customer experiences when in the presence of a personalized shopper or in-store specialist that is typical of a brick and mortar shopping experience. Additionally, current chat systems restrict the start of a chat or chat system communication between a chat client and a chat agent. The restriction includes starting chat proactively or starting chat through controls such as buttons, widgets, or menu items. The chat client's decision to select to start communication via a chat system may route a chat to any chat agent whereby all available chat agents may handle any and all chat client issues without consideration of the specific issues, desires, and/or needs of a chat client. It would be desirable, therefore, to provide personalized techniques to the online chat experiences using chat and chat systems whereby the chat client selects to chat with a personal shopper or specialist chat agent from (preferably) a list, menu, and/or widget that displays and or contains information specific to the needs, desires, or issues of the chat client.

SUMMARY OF THE INVENTION

The present invention, therefore, alters the chat-selection process to provide the client with a choice for selecting among personal shopper persona and/or specialist chat agents within a chat system. In some embodiments, the client may also select to proceed with a traditional chat session. The choice to select a personal shopper routes chats within a chat system with the purpose to handle client requests or issues in a personalized manner. It is, therefore, an object of the present invention to provide a novel web or Internet-based selection approach to chat and chat systems whereby the chat client's choice of a personal shopper routes a chat client to a personalized shopper or specialist agent; this is the most likely approach to promote personalized business development solutions that may include additional information about the chat client user derived from the action of selecting a personal shopper persona.

The present invention overcomes the problems with the known art, at least in part, by providing structure and steps to enhance chat experiences and leverage chat and other data to provide a significantly better and more focused experience for both the visitor (client) and the agent (persona). The leveraged data may be useful in the current chat, in future chats, and in targeted marketing for the visitor.

According to one aspect of the present invention, a method and system is provided for initiating a bidirectional instant messaging session with a client system. The client system is preferably provided with an identifier that identifies a visitor. The client preferably (i) displays information that identifies a persona associated with or corresponding to a personal shopper to engage with on the site and (ii) displays an indication of an action that the visitor is to perform to begin a chat session with the identified persona representing a personal shopper or other chat-related action. In response to the indicated action being performed, the client system preferably sends to a chat server system the provided identifier and a request to begin a chat session with the identified personal shopper. The chat server system uses the identifier to identify additional information used to generate a personalized chat session between the visitor and the personal shopper.

Preferably, the chat server system receives and stores the additional information for visitors using various computer and/or server systems so that the server system can perform such personalization. The chat server system preferably stores the received additional information in association with an identifier of the visitor and provides the identifier to the client system. When requested by the client system, the chat server system provides information describing the item to the requesting client system. When the chat server system receives a request from a client system, the chat server system preferably combines (i) the additional information stored in association with the identifier included in the displayed information about the personal shoppers, (ii) the displayed indications of actions that a visitor is to perform to begin a chat session with the identified personal shopper, and (iii) the request to begin the chat session.

According to a second aspect of the present invention, a computer-implemented method of placing a request for an Internet chat session between a visitor and a chat persona includes, under control of a client device, displaying to the visitor on the client device information corresponding to (i) a plurality of chat personas, and (ii) a plurality of chat actions determined by a visitor-identifier associated with the visitor. In response to a visitor selection-action performed on the client device, a chat system server selects at least one chat persona from among the displayed plurality of chat personas. In response to another visitor selection-action performed on the client device, the chat system server selects at least one chat action from among the displayed plurality of chat actions. A chat request to begin a chat session and the visitor-identifier are sent from the client device to the chat system server. The chat system server receives the chat request and the visitor identifier. The chat system server retrieves from at least one chat server memory additional information corresponding to the received visitor-identifier. The chat system server generates a personalized chat session for the identified visitor between the client device and the chat system server, using the retrieved additional information.

Preferably, the chat system server includes a personalization engine wherein the chat system server uses (i) the personalization engine and (ii) the retrieved additional information, to provide the plurality of chat personas to the client device. The personalization engine may comprise the layout and text of the persona description, the strategies employed by the persona, the language used during the chat, the recommendations made during the chat, changes to the website. The language personalization may include the choice of vocabulary, the sentence structure, the use of particular phrases, the type of framing used in sentences, the order of presentation of information, the information conveyed, the questions used during the chat. The chat system server preferably provides an augmented dashboard display on a server device display viewable by the selected persona, the augmented dashboard preferably being coupled to the personalization engine. The augmented dashboard preferably displays information corresponding to the visitor. The client device preferably stores at least one cookie for the visitor to alter a layout of the client device display of the plurality of personas in a menu for initiating the chat session, the at least one cookie preferably is stored in a chat server database memory. The client device preferably displays a menu of indicated actions for the visitor, the menu preferably having text corresponding to the visitor's prior server system traffic and behavior. Preferably, each of the selections is initiated by the visitor clicking a button displayed on the client device display. The visitor-identifier may correspond to an anonymous visitor. At least one of the plurality of chat personas may be a computerized chatbot having a personality, skills, and point of view corresponding to a human persona. The computerized chatbot is preferably coupled to the personalization engine, and provides personalized responses to the visitor.

According to a third aspect of the present invention, a computer-implemented method of placing a request for an Internet chat session between a visitor and a chat persona preferably includes a client processing device receiving from a chat server system information corresponding to (i) a plurality of chat personas, and (ii) a plurality of chat actions determined by a visitor-identifier associated with the visitor. The client processing device preferably receives from the visitor a selection-action selecting at least one of the plurality of chat personas. The client processing device also preferably receives from the visitor a selection-action selecting at least one of the plurality of chat actions. The client processing device preferably sends to the chat server system (i) a chat request, and (ii) the visitor-identifier associated with the visitor. The client processing device preferably receives from the chat server system a personalized chat session for the visitor, the personalized chat session corresponding to (i) the selected persona, and (ii) additional information stored in the chat server system, the additional information corresponding to the sent visitor-identifier.

According to a fourth aspect of the present invention, a computer-implemented method of placing a request for an Internet chat session between a visitor and a chat persona preferably includes a chat server providing to a client device information for the client device to display on a client device display (i) a plurality of chat personas, and (ii) a plurality of chat actions determined by a visitor-identifier associated with the visitor. The chat server preferably receives from the client device a selection of at least one of the plurality of chat personas, and in response, selects the at least one persona. The chat server preferably receives from the client device a selection of at least one of the plurality of chat actions, and in response, selects the at least one chat action. The chat server receives from the client device (i) a chat request to begin a chat session, and (ii) the visitor-identifier. The chat server retrieves from at least one chat server memory additional information corresponding to the received visitor-identifier. The chat server generates a personalized chat session for the identified visitor between the client device and the server system, using the retrieved additional information.

Preferably, the chat server provides an augmented dashboard display on a server device viewable by the selected agent, the augmented dashboard being coupled to the personalization engine. The augmented dashboard preferably displays information corresponding to the visitor. In certain embodiments, at least one of the plurality of chat personas comprises a computerized chatbot having a personality, skills, and point of view corresponding to a human persona.

According to a fifth aspect of the present invention, apparatus for placing a request for an Internet chat session between a visitor and a chat persona includes a client processing device and at least one chat server. The client processing device displays to the visitor on a client device display information corresponding to (i) a plurality of chat personas, and (ii) a plurality of chat actions determined by a visitor-identifier associated with the visitor, the information being provided by the at least one chat serve. In response to a visitor selection-action performed on the client device, the at least one chat server selects at least one chat persona from among the displayed plurality of chat personas. In response to another visitor selection-action performed on the client device, the at least one chat server selects at least one chat action from among the displayed plurality of chat actions. The client device sends to the at least one chat server (i) a chat request to begin a chat session, and (ii) the visitor-identifier. The at least one chat server receives the chat request and the visitor identifier. The at least one chat server retrieves from at least one chat server memory additional information corresponding to the received visitor-identifier. The at least one chat server generates a personalized chat session for the identified visitor between the client device and the at least one chat server, using the retrieved additional information.

BRIEF DESCRIPTION OF THE DRAWINGS

FIGS. 6a, 6b, 6c, and 6d are screenshots that display an embodiment of the menu of indicated actions in the present invention.

DETAILED DESCRIPTION OF THE PRESENTLY PREFERRED

Exemplary Embodiments

Figure 1:
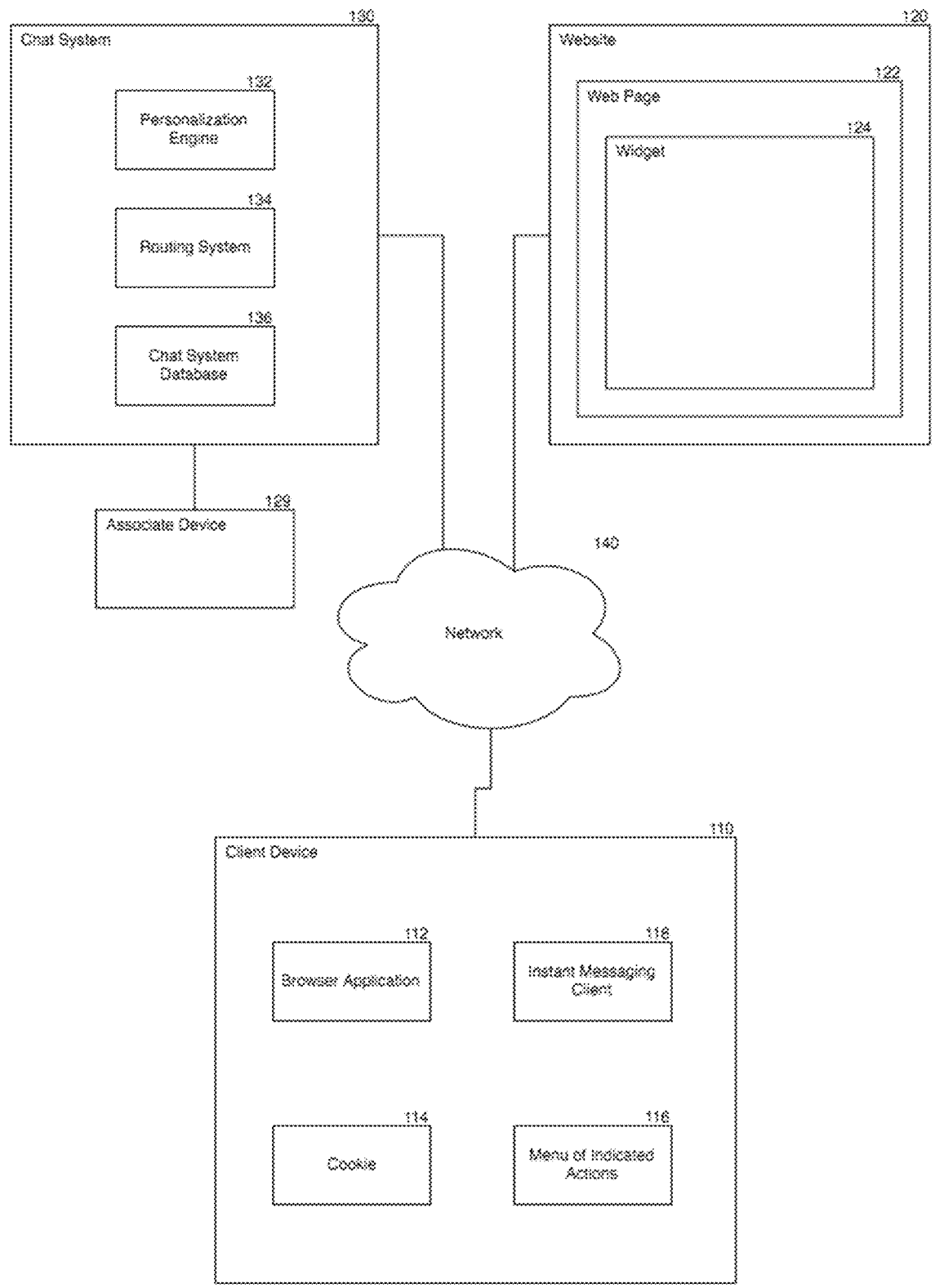
FIG. 1 is a schematic block diagram illustrating an embodiment of the present invention.

The present invention provides a method and apparatus for personalized chat sessions over a network in a client/server environment preferably using an instant messenger. The present invention provides a manner in which a Web site can be configured for personalized chat sessions and interoperation with an instant messaging system. Preferably, a visitor visits a site using a client device and is presented a menu of indicated actions which may be tailored to the specific visitor. The menu of indicated actions will include requests to chat with identified personas routed through a chat server using an instant messaging system available through the client device. The presented menu of indicated actions and identified personas includes information about the personas so that the visitor may best address their personal needs through the chat sessions.

A "device" in this specification may include, but is not limited to, one or more of, or any combination of, processing device(s) such as, a cell phone, a Personal Digital Assistant, a smart watch or other body-borne device (e.g., glasses, pendants, rings, etc.), a personal computer, a laptop, a pad, a cloud-access device, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

In overview, a menu of indicated actions according to the present invention is preferably displayed on a client device display and provides for personalized chat sessions, preferably using visitor profile data and/or visitor persona choice. The visitor profile data may be stored in a server system database memory and may correspond to a visitor identifier and/or prior visitor traffic and behavior on the server system and/or other server systems of other commercial vendors. In one embodiment, the server system assigns a unique client identifier to each client system and/or each client device. The server system also preferably stores visitor specific information for various potential visitors which may or may not correspond to one or more client devices. The visitor-specific information may have been collected from a previous order placed by the visitor, items placed in shopping carts, links navigated on the web page, cookies collected from other websites, prior chat sessions, and/or other records uniquely identifying the visitor. The server system preferably maps each client identifier to a visitor that may use that client system to place a request to chat, and stores the information in one or more client server database memories. The server system preferably maps the client identifiers to the visitor who last placed a request to chat using that client system and/or device, and also stores the information in one or more client server database memories. The chat server system preferably determines whether the client identifier for that client system and/or device is mapped to a particular visitor. If so mapped, the chat server system determines whether to display a customized menu of indicated actions for the user to click-on to request a chat session. If not mapped (for example, where the visitor and or the client device is anonymous), then a default menu of indicated actions is preferably displayed. In some embodiments the menu of indicated actions may be adapted to the particular page or pages that the visitor has previously visited on the website, items placed in the cart, and/or other actions the visitor takes or has taken.

FIG. 1 illustrates an embodiment of a system 100 for providing personalized chat sessions to a visitor of a client system. The system 100 preferably includes one or more client devices 110, one or more websites or applications 120 (which may be hosted by (stored on) the chat server and displayed on the client device(s)), the associate (persona) device 129, the chat server system 130, and a network 140 (e.g., the Internet). The embodiment of the system 100 in FIG. 1, for purposes of illustration only, includes only a single website 120, a single client (user, visitor) device 110, a single associate (persona) device 129 (which may comprise a display, keyboard, mouse, and one or more processors), and a single chat server system 130. However, in other embodiments the system 100 may include a plurality of client devices 110, a plurality of websites 120, a plurality of associate devices 129, and/or a plurality of chat server systems 130. In certain embodiments, the chat server 130 is operated by the chat service provider; whereas the websites 120 may be hosted separate from the chat server 130 in that they may be operated by different entities. In various embodiments, however, the chat system 130 and the website 120 operate in conjunction to provide personalized chat services to visitors of the website through the client device 110. In this sense, the chat server system 130 provides a platform, or backbone, which other systems, such as websites 120, may use to provide personalized chat services and functionalities to visitors.

The client device 110 preferably comprises one or more computing devices that can receive input from a visitor and can transmit and receive data via the network 140. For example, the client device 110 may be a desktop computer, a laptop computer, a smart phone, a personal digital assistant (PDA), a smart tablet, or any other device including computing functionality and data communication capabilities. The client device 110 is preferably configured to communicate with the website 120 and the chat server system 130 via the network 140, which may comprise any combination of local area and/or wide area networks, using both wired and wireless communication systems.

In one embodiment, the client device 110 displays content from the website 120 or from the chat system 130 by processing a markup language document 116 received from the website 120 or from the chat system 130 using a browser application 120. The markup language document 116 identifies content and one or more instructions describing formatting or presentation described by the markup language document 116. For example, the markup language document 116 preferably includes instructions for generating and displaying a web page having multiple frames that may include text and/or image data retrieved from the website 120 and/or the chat system 130. In various embodiments, the markup language document 116 comprises a data file including extensible markup language (XML) data, extensible hypertext markup language (XHTML) data or other markup language data.

In one embodiment, the user device 110 also stores a cookie 114 including data indicating whether a visitor using the client device 110 is identified by the chat system 130. The cookie 114 indicates whether the visitor using the client device 110 is involved in an active session where the client device 110 exchanges data with the chat system 130, allowing modification of the data communicated from the chat system 130 to the client device 110. The cookie 114 is also stored in the chat server 130 database memory 136. Use of the cookie 114 in exchanging data between the client device 110, the chat system 130, and/or the website 120 is further described below in conjunction with FIG. 2.

The website 120 preferably comprises one or more web servers storing one or more web pages 122, which are communicated to the client device 110 using the network 140. A web page 122 included in the website 120 typically comprises a markup language document identifying content and including instructions specifying formatting or presentation of the identified content. In one embodiment, a web page 122 includes a widget 124 comprising instructions that, when executed by a browser application 112 of a client device 110, retrieve data from the chat system 130 and display the information retrieved from the chat system 130. For example, the widget 124 may comprise an instruction associated with the chat system 130 that generates a frame within the web page that includes information from (and enables chat sessions through) the chat system 130. Hence, the widget 124 allows a web page 122 from the website 120 to provide personalized chat requests and personalized chat sessions using information from the chat system 130 when the web page 122 is rendered and displayed by a browser application 112 of a client device 110.

The chat server system 130 preferably comprises one or more databases 136 storing information about visitors, associates, websites, and client devices. That information may include identification information corresponding to one or more person(s) and/or device(s), prior visits by the person(s)/device(s) to the chat server system 130, to the website 120, to the web page 122, using the widget 124. The information may also include traffic metrics for the one or more person(s) and/or device(s), visits by the person(s)/device(s) to other related or non-related commercial websites, and/or metadata obtained from the one or more person(s) and/or device(s) from prior or current Internet sessions.

The chat server system 130 also enables chat sessions with website visitors, which in some embodiments are performed through chat sessions using bidirectional instant messaging clients connected via the network 140. In various embodiments, however, the chat system will be coupled with a bot system that can be programmed to participate in the chat session with the visitor through an instant messaging client 118 on the client device 110. The chat system is further described below with respect to FIG. 2. The widget 124 on the webpage 122, in conjunction with the chat system 130, preferably displays a menu of indicated actions 116 on the client device for the visitor to connect with the chat system 130. The indicated menu of actions 116 preferably includes a choice of personas (e.g., FIG. 6b) with which the visitor may engage with in a chat session. The chat server system 130 facilitates this connection, and in one embodiment may dynamically generate the menu of indicated actions 116 in response to information about the user as described below with respect to FIG. 3.

Figure 2:
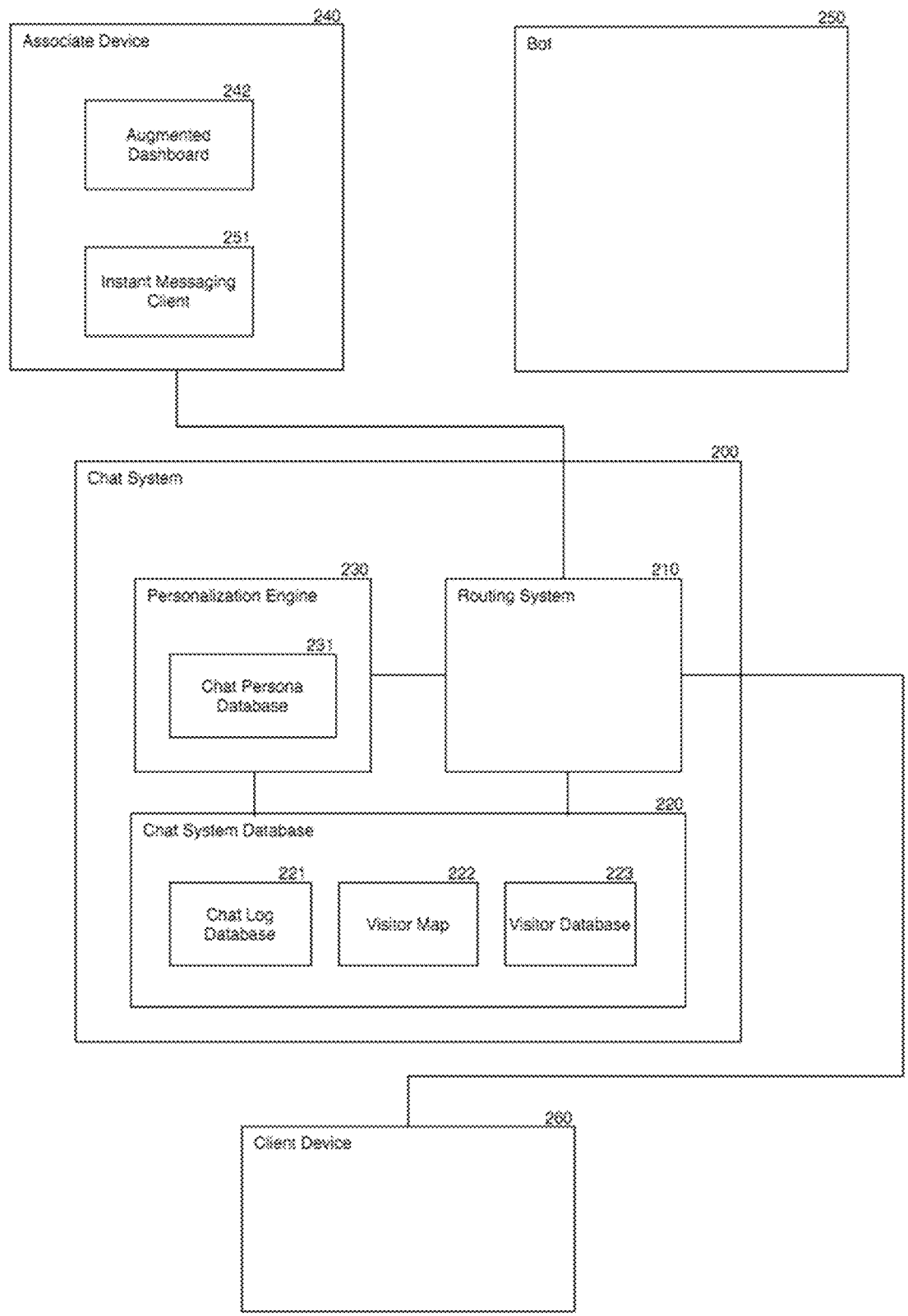
FIG. 2 is a schematic block diagram illustrating an embodiment of the present invention.

FIG. 2 illustrates one embodiment of a chat server system 200 that generates personalized chat sessions to a visitor of a client system or device 260. The chat system includes a chat routing system server 210, a chat system database 220, and a personalization engine 230. The chat routing system server 210 communicates with the chat system database 220 and the personalization engine 230 to select a set of chat personas to send to an associate client system and/or device 240 and/or a bot system 250 which enable manual or automated chat sessions through the system to enable a connection with the visitor, for example through the instant messaging system 118 on the client device 110 in FIG. 1. A bot system 250 may be defined as a conversational agent that interacts with the visitor using natural language sentences in accordance with a particular persona. The chatbot includes a function that generates a natural language message given a conversation context. The conversational context is the sequence of messages up to a particular point in time of the dialogue as well as the metadata including the pages the visitor has visited, information about the visitor identity, the persona chosen by the visitor, the query chosen by the visitor, as well as prior dialogues with the visitor. The chatbot is in accordance with a particular persona if the natural language sentences produced by the chatbot are indistinguishable from sentences produced by a human agent adopting that persona. This persona may be achieved through hard coding of the responses or through machine learning of the responses based on prior chat logs between visitors and human agents which adopt the personality.

The chat system preferably communicates with the client device system 110 to enable personalized chat sessions that are controlled through the routing engine 210. The chat system database memory 220 preferably contains stored information about previous chats 221, visitor information 223, and a mapping of visitors' identifiers to visitor information 222. The personalization engine preferably contains a chat persona database 231. The chat persona database 231 stores information related to chat personas that a visitor can potentially be presented with. The chat persona database 231 stores information related to chat personas that may include records of chat logs between visitors and particular chat personas, the text/layout for display in the menu of indicated actions, information for the augmented dashboard 242 when using the associate device 240, descriptions of the strategies associated with the persona, parameterization information for loading the personality into the chatbot. The chat routing system 210 preferably queries information from both the chat system database 220 and the personalization engine 230, and sends that data to associate device(s) 240.

In some embodiments a visitor device 260 that has personalized chat enabled will send a visitor identifier to the chat routing system 210. On the Web page, in this embodiment, the visitor identifier may be in the form of a "cookie". The chat routing engine 210 preferably uses the visitor identifier to map the visitor to a record in the visitor database memory 223. The visitor database memory 223 stores additional information associated with the visitor previously obtained by the chat system 200. The chat system 200 obtains this additional information from previous chat sessions, visitor purchases, or any previous visitor interaction with the chat system 200. Using this additional information, the routing engine 210 preferably selects a set of chat personas from the chat persona database 231. The chat persona database 231 stores information related to chat personas that could potentially be presented to this visitor. The chat routing system 210 preferably sends to the client device 260 the selected chat personas for display in a menu. In various other embodiments, the routing engine 210 displays a set of chat personas from the chat persona database 231 targeted for the particular Web page or from a fixed set of available personas.

The client can request a specific chat persona from the list of personas displayed in the menu displayed on the client device 260. When the visitor requests a specific chat persona, the chat routing system 210 preferably connects the visitor to the requested chat persona and begins a chat session. In some embodiments the chat is routed by the routing engine 210 to an associate device 240 operated by a member of a team of associates trained for that persona or personas. In various other embodiments, a chatbot 250 fitting the persona can be described as a conversational agent that interacts with the visitor using natural language sentences in accordance with a particular persona. The chatbot includes a function that generates a natural language message given a conversation context. The conversational context is the sequence of messages up to a particular point in time of the dialogue as well as the metadata including the pages the visitor has visited, information about the visitor identity, the persona chosen by the visitor, the query chosen by the visitor, as well as prior dialogues with the visitor. The chatbot is in accordance with a particular persona if the natural language sentences produced by the chatbot are indistinguishable from sentences produced by a human agent adopting that persona. This persona may be achieved through hard coding of the responses or through machine learning of the responses based on prior chat logs between visitors and human agents which adopt the personality and may be engaged in the chat. The chatbot emulates the persona based on adaptive natural language generation. There are many possible messages sent out in the course of a dialogue by an agent that would fit the prior dialogue context and assist in achieving the agent's goals. The persona is reflected on which goals are emphasized and what messages are preferred in the course of generation. To emulate a persona said chatbot will select messages that achieve goals congruent to the personality. The chatbot emulation of a persona is evaluated by means of human judges determining whether the dialogues produced by the chatbot mirror a human agent conversation with the said persona closely. The associate or chatbot trained for that persona would interact with the visitor in a way that mirrors the way that the selected persona would. For example, "Moira" is a persona for a fashion industry client. She describes herself as minimal, classic, and chic. Her style icons are Kendall Jenner and Dannielle Bernstein, and she is an expert in perfecting everyday glamour. Each of the associates or bots trained as an expert on Moira's "team" preferably have the same skillset, know how to recommend products like "Moira" would, and know how to talk and interact like "Moira" would. During the chat session, the chat routing system 210 will communicate with the associate device 240. The chat routing system 210 queries the chat system database 220 and the personalization engine 230 and pushes information about the chat session to the associate device 240 which may use the information to provide the augmented dashboard 242 with the identified persona so that the associate can provide assistance by mirroring the identified persona.

The associate device 240 preferably includes an instant messaging client 251 and an augmented dashboard 242. The instant messaging client preferably provides a means of communication between the associate device 240 and the visitor device 260. The augmented dashboard 242 provides the associate information about the chat session including, but not limited to key performance indicators such as, notifications, product recommendations, response recommendations, and information relating to visitor behavior including the specific pages a visitor is browsing on, how long the visitor has been on a site or on a page, a visitor's geographic location, previous history when visiting the site, the click behavior of the visitor, and predictive analytics based on these clicks.

In some embodiments, the personas are crafted iteratively through these multiple chat interactions. For example, after the user selects the given persona, the suggestions from the augmented dashboard 242 and/or the bot 250 are compared to the responses given by the visitor and the visitor's behavior. Through an iterative learning process, the routing system server further refines the augmented dashboard 242 and/or the bot 250 to produce responses that better meet the needs of visitors and guide visitors towards purchasing or other desired behaviors.

Figure 3:
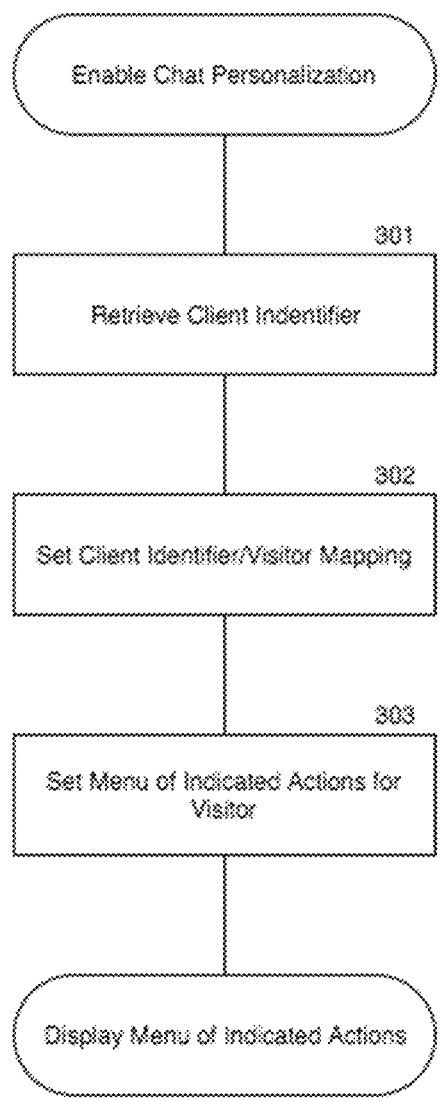
FIG. 3 is a flow diagram of a routine that enables customization of the menu of indicated actions.

FIG. 3 is a flow diagram of a chat system that personalizes the menu of indicated actions 116 for a visitor. To personalize the menu of indicated actions 116, the chat system 130 needs to have information about the visitor. The visitor information can be collected in various ways. The information can be collected through the visitor's previous interactions with the Web page, mobile application(s), or interaction with any other system where the personalization engine can exist. With this visitor information, the chat server system can select chat personas to present to the visitor within the client system.

In step 301, the chat server system 130 retrieves a visitor identifier from the client device 110, which is connected to the chat system 130 via the network 140. In a Web page 120, this visitor identifier may take the form of a cookie (which identifies a visitor's previous visits to the site) 114, but can be of many forms such as a site login identifier, IP address, identification based on visitor inputs including character entry timing, word choice, and/or message structure. In step 302, the chat server system uses an identifiers/visitors table to map the visitor identifier to a visitor record stored in the database 136. The visitor record in the database contains additional information about the visitor. In step 303, the chat server system uses the additional information to select a set of actions including a list of chat personas to present to the visitor within the client system. These chat personas are drawn from the chat persona database 231 in the personalization engine 230, which may depend on which associates and/or bots are available for a chat session. These options are then displayed in step 304, the display of the menu of indicated actions 116 may include custom text, formatting, pictures, etc. based on the customization from the previous step 303.

Figure 4:
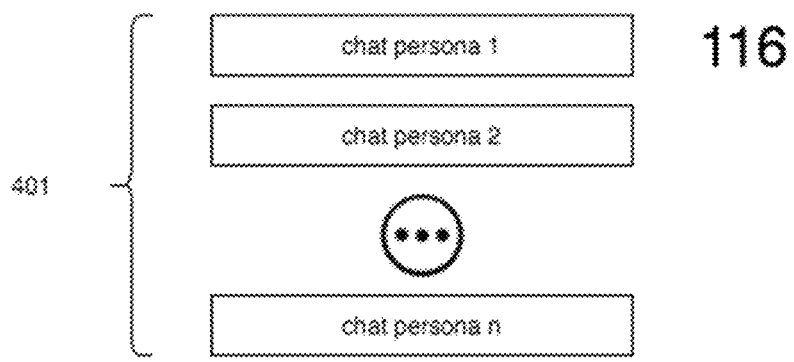
FIG. 4 is an illustration of the menu of indicated actions.
Figure 4:
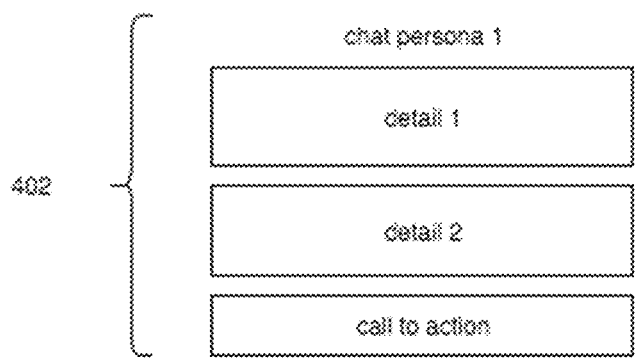

FIG. 4. is an illustration of a particular embodiment of a menu of indicated actions 116. In various embodiments, the menu of indicated actions 116 will list a set of chat personas drawn from the persona database 231 from the personalization engine 230. The menu of indicated actions 116 will be displayed with a short description, picture, or other form on the client device 110. In various embodiments, when the user hovers over the menu of indicated actions 401, clicks on the menu of indicated actions 401, and/or otherwise interacts with the menu of indicated actions 401, further details 402 are shown along with a button or other call to action to initiate a chat with an indicated persona.

Figure 5A:
FIGS. 5a, 5b, 5c, and 5d are wireframes that display an embodiment of the menu of indicated actions in the present invention.
Figure 5B:
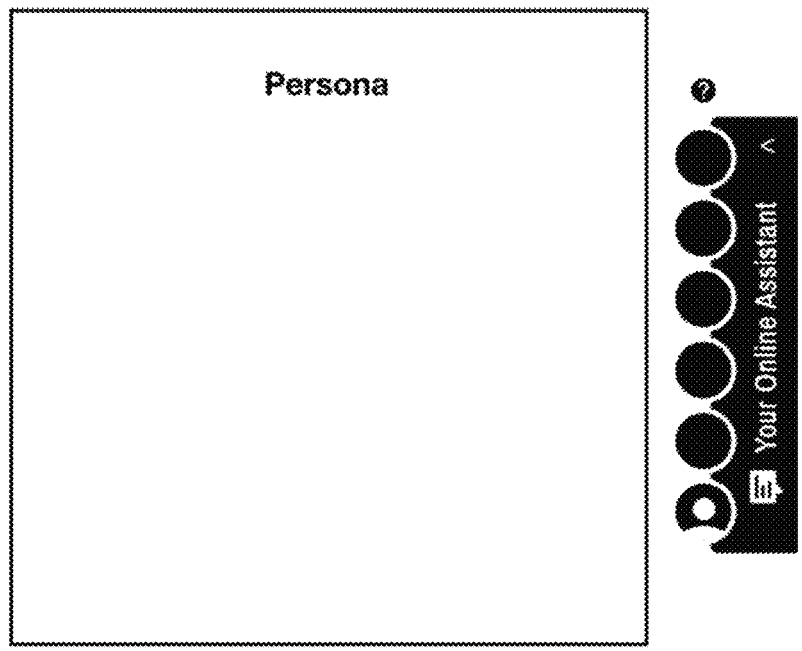
Figure 5C:
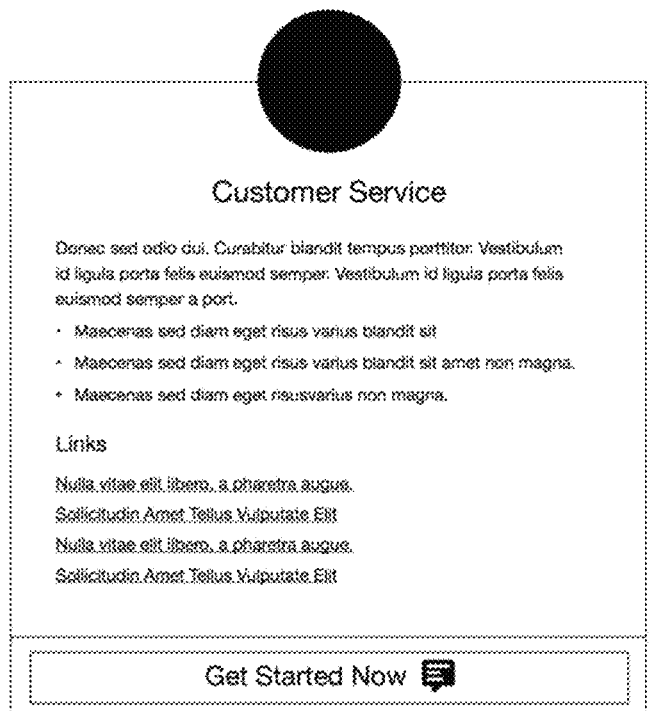
Figure 5D:
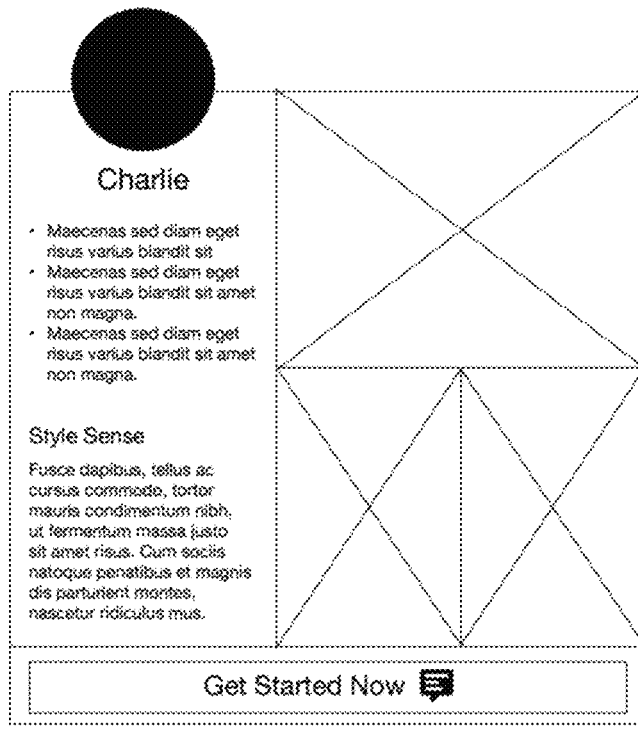
Figure 6A:
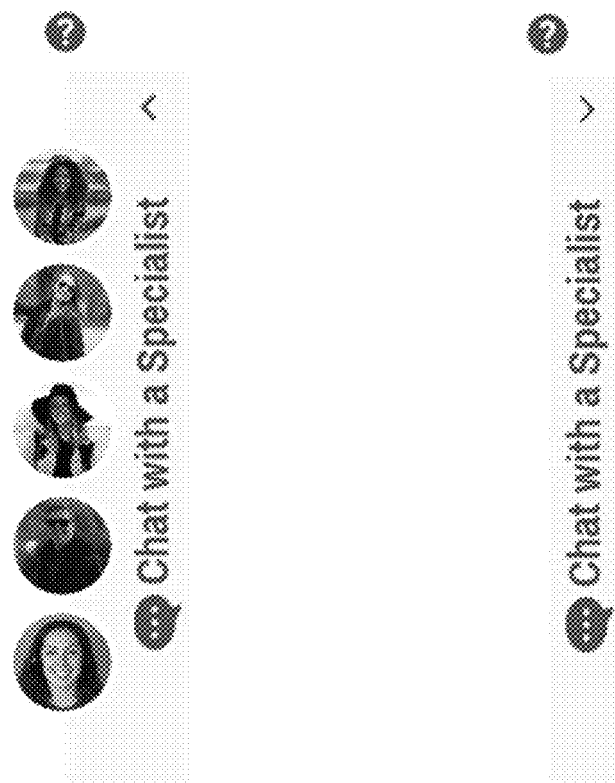
Figure 6C:
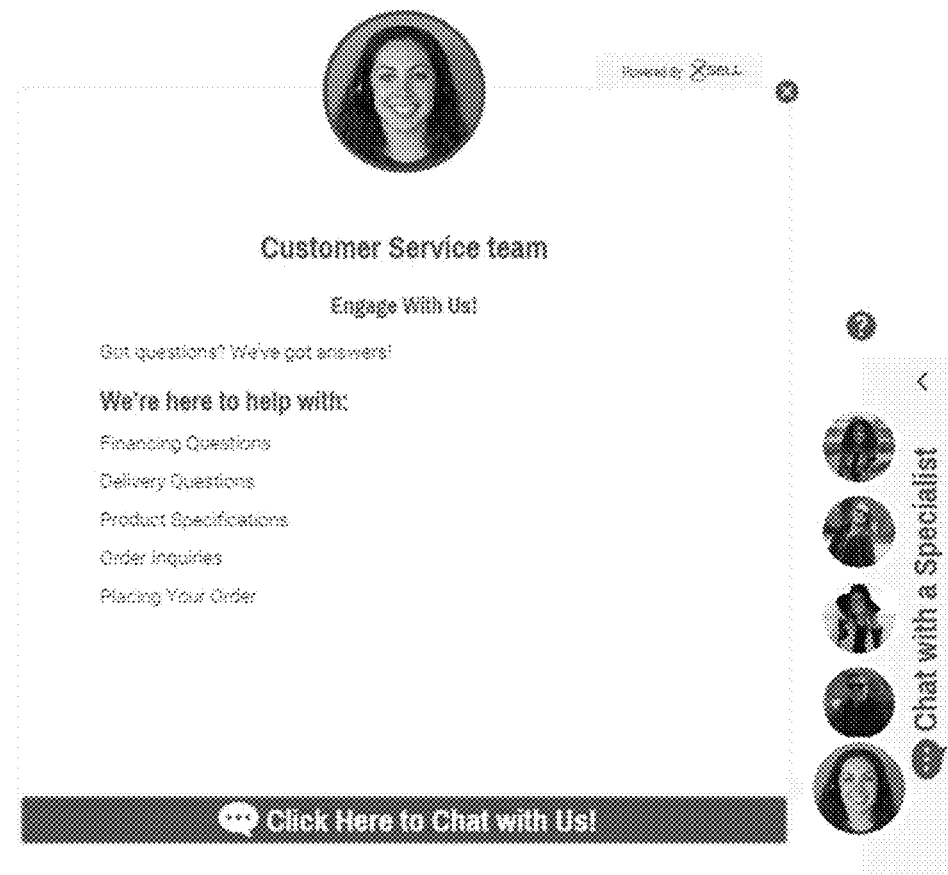
Figure 6D:
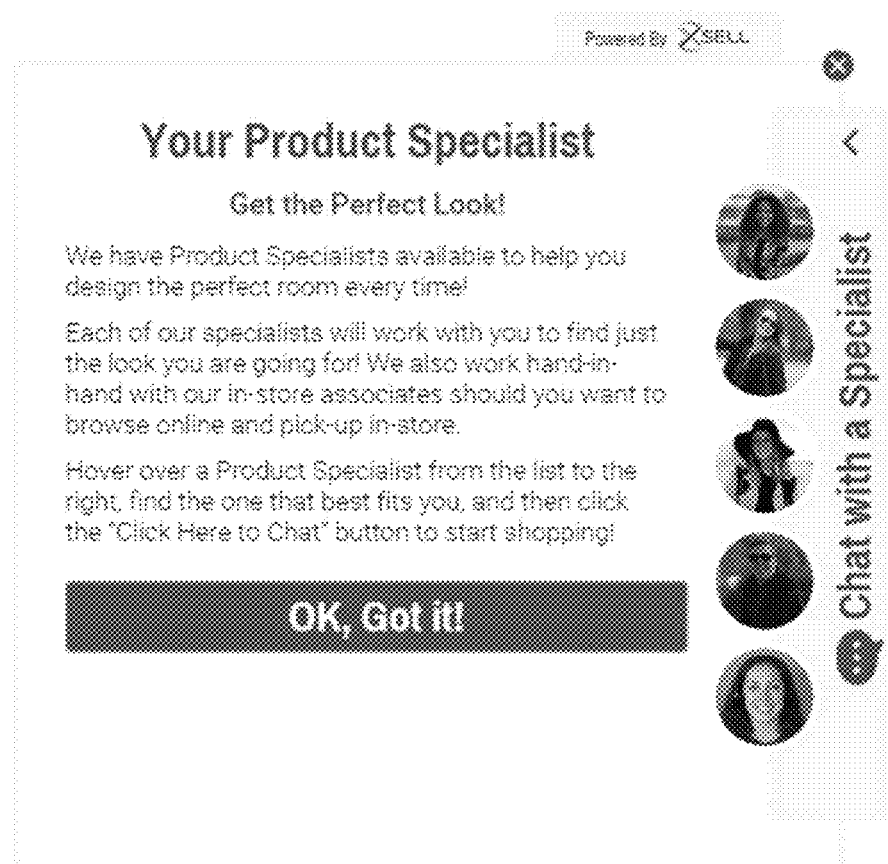

FIGS. 5a-5d are illustrations of example embodiments of the menu of indicated actions 116. FIG. 5a depicts an example a menu of indicated actions 116 in the default state on the web page from the client device 110; each entry of the menu may contain a picture or other short description. A screenshot corresponding to the present embodiment can be seen in FIG. 6a. When activated by the visitor by clicking-on/hovering-over/other-interaction (e.g., eye-tracking, or verbal command) with an item in the menu of indicated actions 116, this will activate a description as shown in FIG. 5b. If the menu item is a persona, then there will be a persona description, as shown in FIG. 6b (as further illustrated in FIGS. 5d and 6d). In the case of a general customer service menu item, in various embodiments, a display similar to FIG. 6c will be shown as illustrated in FIG. 5d. The text included in these embodiments is present to assist the visitor in revealing their personal preferences and the type of assistance they seek to receive during the chat session. The specific text and formatting may be customized by the personalization engine 230 in response to the user cookie 114.

Thus, what has been described is method and apparatus for personalizing an Internet chat experience including structure and/or functions whereby a chat request is initially received from a client. The received chat request in analyzed based on a plurality of predetermined chat characteristics. At least one chat persona is selected in accordance with the analyzed plurality of predetermined chat associate characteristics. The at least one selected chat persona is provided to the client. The client then provides an indication of a preferred chat persona, and a chat session is then provided between the client and the indicated preferred chat persona, thus personalizing the chat experience for the client.

The present invention is disclosed herein in terms of preferred embodiments thereof, which provide apparatus and method for personalizing an Internet chat experience, as defined in the appended claims. Various changes, modifications, and alterations in the teachings of the present invention may be contemplated by those skilled in the art without departing from the intended spirit and scope of the appended claims. It is intended that the present invention encompass such changes and modifications.

What is claimed is:

1. A computer-implemented method of undertaking an Internet chat session, comprising the steps of:
instructing a client device to display information corresponding to a plurality of chat personas, request selection of one of the chat personas, and transmit information regarding the selection;
in response to receiving information regarding the selection, selecting at least one chat persona from the plurality of chat personas;
receiving using a chat system server a chat request to begin a chat session;
instructing using the chat system server an associate device operable by an associate to invoke an instant messaging client adapted to enable communications between the associate device and the client device; and
using the chat system server to instruct the associate device to display a plurality of response recommendations developed by the chat system server, wherein the plurality of response recommendations is developed iteratively in response to messages received from the client device, in accordance with the at least one chat persona, and using machine learning based on prior chat logs.

2. The method according to claim 1, wherein the chat system server includes a personalization engine comprising at least two of: (i) layout of the persona description, (ii) text of the persona description, (iii) sales and/or communications strategies employed by the persona, (iv) language used during the chat, (v) recommendations made during the chat, and (vi) changes to the website, wherein the (iv) language includes at least two of: (iva) choice of vocabulary, (ivb) sentence structure, (ivc) use of particular phrases, (ivd) type of framing used in sentences, (ive) order of presentation of information, (ivf) information conveyed, and (ivg) questions used during the chat; and wherein the chat system server uses (i) the personalization engine and (ii) the retrieved additional information to provide the plurality of chat personas to the client device.

3. The method according to claim 2, further including the step of instructing using the chat system server the associate device to display an augmented dashboard, the augmented dashboard being coupled to the personalization engine.

4. The method of claim 3, wherein the augmented dashboard displays information corresponding to a user of the client device.

5. The method of claim 3, further including the step of instructing the client device to store at least one cookie in a chat server database memory, wherein the cookie is associated with an instruction to alter on a display of the client device a layout of a menu of the plurality of personas.

6. The method according to claim 2, wherein at least one of the plurality of chat personas comprises a computerized chatbot having a personality, skills, and point of view corresponding to a human persona.

7. The method according to claim 6, wherein the computerized chatbot is coupled to the personalization engine, and provides responses developed by the personalization engine to the visitor.

8. The method of claim 1, further including the step of instructing the client device to display a menu of indicated actions, the menu having text corresponding to prior server system traffic and behavior.

9. The method of claim 1, wherein each of the selections is initiated by clicking a button displayed on a client device display.

10. The method of claim 1, further including the step of generating a visitor-identifier that corresponds to an anonymous visitor.

11. A computer-implemented method of undertaking an Internet chat session, comprising the steps of:
   receiving using a client processing device information corresponding to a plurality of chat personas;
   receiving using the client processing device a selection of at least one of the plurality of chat personas;
   sending using the client processing device a chat request; and
   enabling using the client processing device instant messaging communications with an associate device operable by an associate;
   receiving from the associate device a response recommendation, wherein the response recommendation is developed by a chat system server in accordance with the at least one chat persona and using machine learning of prior chat logs.

12. The method of claim 11, further including the step of storing at the client processing device at least one cookie, wherein the cookie is associated with instructions to alter a layout on a display of the client processing device a menu of the plurality of personas.

13. The method of claim 11, further including the step of displaying a menu of indicated actions, the menu having text corresponding to prior server system traffic and behavior.

14. The method of claim 11, wherein each of the selections is initiated by clicking a button displayed on a client device display.

15. The method of claim 11, further including the step of generating a visitor-identifier that corresponds to an anonymous visitor.

16. A computer-implemented method of undertaking an Internet chat session, comprising the steps of:
   providing from a chat server to a client device information for the client device to display on a client device display a plurality of chat personas;
   receiving at the chat server from the client device a selection of at least one of the plurality of chat personas, and in response;
   selecting at the chat server said at least one persona;
   receiving at the chat server from the client device a chat request to begin a chat session;
   generating at the chat server a plurality of response recommendations, wherein the plurality of response recommendations is developed iteratively in response to messages received from the client device, in accordance with the at least one persona, and using machine learning of prior chat logs; and
   instructing using the chat server an associate device operable by an associate to invoke an instant messaging client adapted to enable communications between the associate device and the client device and to display the plurality of response recommendations.

17. The method of claim 16, wherein the chat server provides an augmented dashboard display on a server device viewable by the selected persona, the augmented dashboard being coupled to the personalization engine.

18. The method of claim 17, wherein the augmented dashboard displays information corresponding to the visitor.

19. The method of claim 17, wherein at least one of the plurality of chat personas comprises a computerized chatbot having a personality, skills, and point of view corresponding to a human persona.

20. An apparatus for undertaking an Internet chat session, the apparatus comprising a chat server including:
   first means for instructing a client device to display a plurality of chat personas and to transmit a selection of one of the plurality of chat personas,
   second means for receiving a selection of the chat persona selected from the plurality of personas and a chat request, and
   third means for instructing an associate device operable by an associate to invoke an instant messaging client adapted to enable communications between the associate device and the client device; and
   fourth means for instructing the associate device to display a plurality of response recommendations developed by the chat system server, wherein the plurality of response recommendations is developed iteratively in response to messages received from the client device, in accordance with the at least one chat persona, and using machine learning of prior chat logs.

* * * * *